(12) United States Patent
Jaeger et al.

(10) Patent No.: US 7,721,990 B2
(45) Date of Patent: May 25, 2010

(54) PASSENGER COMPARTMENT

(75) Inventors: Mark Jaeger, Bremen (DE); Oliver Doebertin, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 874 days.

(21) Appl. No.: 11/460,788

(22) Filed: Jul. 28, 2006

(65) Prior Publication Data

US 2007/0034742 A1 Feb. 15, 2007

Related U.S. Application Data

(60) Provisional application No. 60/703,802, filed on Jul. 29, 2005.

(30) Foreign Application Priority Data

Jul. 29, 2005 (DE) .................. 10 2005 035 752

(51) Int. Cl.
    B64D 11/06 (2006.01)
(52) U.S. Cl. .................. 244/118.6; 297/232
(58) Field of Classification Search ............. 244/118.6, 244/118.5, 120, 171.9; 52/70, 71, 238.1, 52/239; 114/71, 189, 192; D12/345; 5/9.1, 5/118; 105/314–317, 319, 323, 329.1; 297/63, 297/245, 232, 257, 354.3
See application file for complete search history.

(56) References Cited

U.S. PATENT DOCUMENTS

| 2,632,408 | A |   | 3/1953  | Giles             |
|-----------|---|---|---------|-------------------|
| 3,677,322 | A | * | 7/1972  | Brorson et al. ............. 160/135 |
| 4,185,799 | A |   | 1/1980  | Richards, Jr.     |
| 5,542,626 | A |   | 8/1996  | Beuck et al.      |
| 6,073,883 | A |   | 6/2000  | Ohlmann et al.    |
| 6,182,926 | B1|   | 2/2001  | Moore             |
| 6,257,523 | B1| * | 7/2001  | Olliges ................... 244/118.5 |
| 6,305,645 | B1|   | 10/2001 | Moore             |
| 6,464,169 | B1|   | 10/2002 | Johnson et al.    |
| 6,581,876 | B2|   | 6/2003  | Cheung            |
| 6,669,141 | B2|   | 12/2003 | Schmidt-Schaeffer |
| 6,848,654 | B1|   | 2/2005  | Mills et al.      |
| 7,188,806 | B2| * | 3/2007  | Beroth ................... 244/122 R |

(Continued)

FOREIGN PATENT DOCUMENTS

DE 2234308 2/1973

(Continued)

OTHER PUBLICATIONS

Arturo Weiss, The Airborne Hotel, Aircraft Interiors, Feb. 2003, p. 14.

(Continued)

*Primary Examiner*—Michael R Mansen
*Assistant Examiner*—Joshua J Michener
(74) *Attorney, Agent, or Firm*—Christopher Paradies; Fowler White Boggs P.A.

(57) ABSTRACT

The field relates to a compartment of an aircraft. The compartment is delimited by a section of the outer wall of the cabin, as well as by two identical foldable partition segments that delimit the compartment from adjacent compartments. So that a compartment passenger's compliance with the requirement to fasten the seat belt may nonetheless be verified during the flight, the partition segments are arranged such that between them access openings to the compartment are created.

18 Claims, 4 Drawing Sheets

U.S. PATENT DOCUMENTS

| | | |
|---|---|---|
| 2004/0232283 A1 | 11/2004 | Ferry et al. |
| 2005/0023413 A1 | 2/2005 | Saint-Jalmes |
| 2005/0189451 A1* | 9/2005 | Mercier ................ 244/118.6 |
| 2005/0189804 A1* | 9/2005 | Mercier ................ 297/232 |

FOREIGN PATENT DOCUMENTS

| | | |
|---|---|---|
| DE | 2630210 A1 | 1/1978 |
| DE | 19544754 A1 | 6/1996 |
| EP | 0867365 A2 | 9/1998 |
| GB | 733081 | 7/1955 |
| WO | 80/01156 A1 | 6/1980 |
| WO | 02/28712 A1 | 4/2002 |
| WO | 2005/080196 A1 | 9/2005 |
| WO | 2006/094091 A2 | 9/2006 |

OTHER PUBLICATIONS

Air Transport, Aviation Week & Space Technology, Mar. 6, 2000, p. 40.

Bruce A. Smith, Boeing Revamps 747X Wing Design, Aviation Week & Space Technology, Mar. 12, 2001, p. 42.

Boeing Mulls Huge Cabin, Aviation Week & Space Technology, May 17, 1999, p. 60.

Luftfahrt, Kopf an Kopf, Der Spiegel, Jun. 2000, p. 124.

* cited by examiner

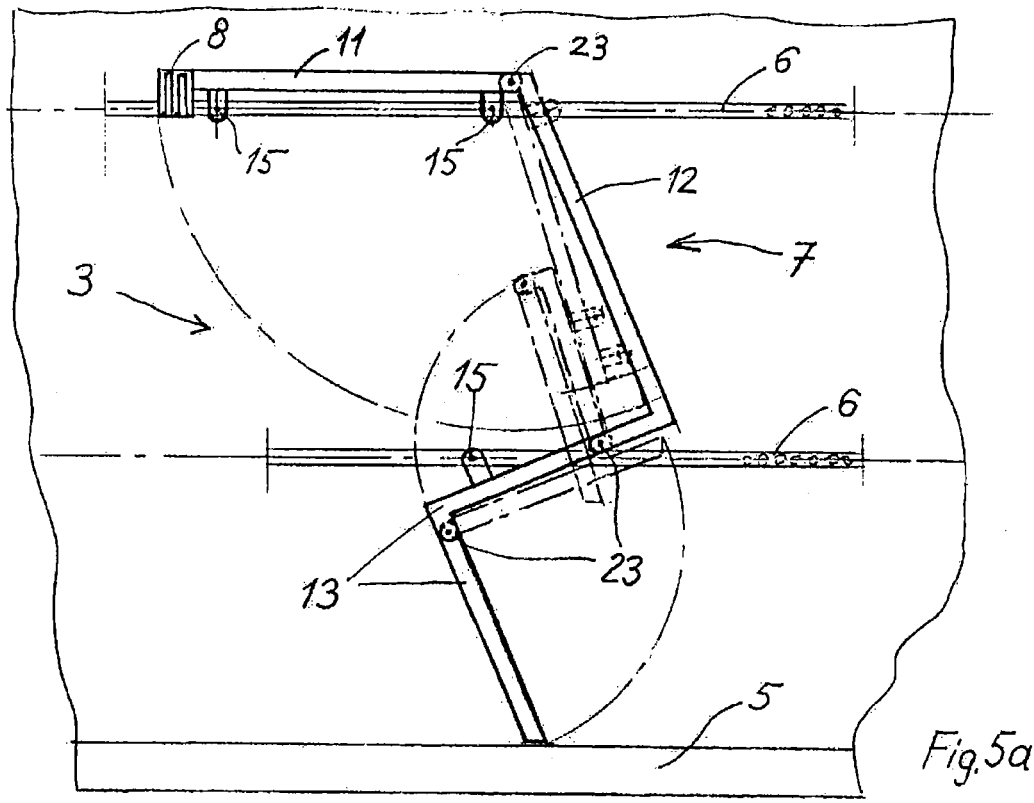
Fig.5a
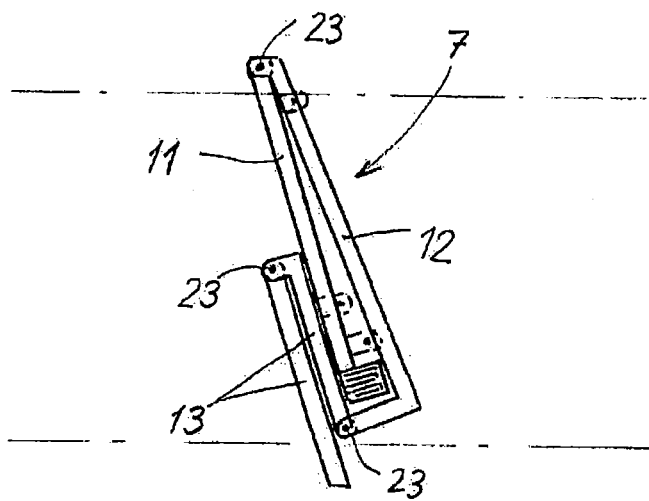
Fig.5b
Fig.5

PASSENGER COMPARTMENT

This application claims the benefit of the filing date of the German Patent Application No. 10 2005 035 752.0 filed Jul. 29, 2005 and of the U.S. Provisional Patent Application No. 60/703,802 filed Jul. 29, 2005, the disclosures of which are hereby incorporated herein by reference.

TECHNICAL FIELD

The field generally relates to the technical field of the interior outfitting of aircraft cabins. Additionally, the field relates to a compartment for accommodating aircraft passengers, which may be installed in other means of transport, such as road vehicles, rail vehicles or ships.

BACKGROUND TO THE INVENTION

Although passengers in business class or first class pay significantly more for their tickets than those in economy class, accommodations during a flight leave a great deal to be desired. For example, the sleeping position of the seats is often not horizontal but are merely inclined. For reasons of space, such seats positioned behind each other and are arranged so as to overlap. For example, the foot end of one seat projects underneath the head end of the respective other seat, as described in DE 195 44 754 and shown in FIG. 25.

Further serious shortcomings relate to the lack of privacy for passengers. On long-distance flights passengers need to sleep for an extended period of time, and often do not want to wear outdoor clothing during that time. However, frequently, there is no opportunity for discretely changing clothes, even in a first-class cabin, as an effective visual barrier to adjacent seats does not exist.

In order to ensure a horizontal sleeping position in a space that is closed off for privacy, the industry proposes rest compartments, for example, shown in the magazine "Aviation Week" of Mar. 6, 2000, on page 40; May 17, 1999, on page 60; or Mar. 12, 2001, on page 42. However, the proposals presented therein are intended for the flight crew rather than for passengers. Furthermore, accommodating passengers in the case of the above-mentioned examples is questionable, because during certain flight phases such as, takeoff, landing or wind gusts, the cabin crew must be able to monitor, without any impediment, passengers' compliance with the requirement to fasten their seat belts. Such monitoring is, however, only possible if members of the cabin crew may easily see the seat of the respective passenger, although providing a certain degree of privacy, as well as a horizontal sleeping position, these solutions do not take into account the aspect of the passenger being safely restrained by the seat belt as described in DE 26 30 210 and DE 22 34 308. Also, these described solutions, due to the extremely confined nature of the proposed berth arrangements, are unlikely to be suitable for accommodating passengers.

Another solution is provided in the proposal presented on page 14 of the January/February edition of the journal "Aircraft Interiors". In that article, in order to save space, compartments are arranged so as to be staggered in height. While in this way criteria such as, for example, a horizontal sleeping position and adequate privacy are met, there are however concerns relating to evacuation regulations. Furthermore, monitoring passengers' compliance with the regulation to have their seat belts fastened is difficult.

An article in "Der Spiegel", June 2000, page 124, discloses a solution from British Airways. This arrangement provides a horizontal surface for sleeping; however, the partition panels or privacy screens that are arranged at half height do not even come close to providing a satisfactory level of privacy for passengers. The solution is further described in the patent specification, DE 195 44 754. Instead of an axis-parallel arrangement of the seats, for various reasons, seats are arranged somewhat obliquely such that the seat points somewhat towards the row of windows towards the outside. A similar arrangement with offset seats that are arranged obliquely is, for example, described in GB 733 081, except seats cannot be reclined to a flat sleeping surface. While DE 195 44 754 proposes ways to improve privacy, the proposed half-height partition panels or screens are inadequate.

SUMMARY OF THE INVENTION

It is an object of the present invention to provide a compartment that offers more privacy for the passengers accommodated therein.

The compartment according to one example of the invention comprises specially designed partition segments which incorporate the outer wall of the cabin. The solution according to the invention ensures that the best-possible degree of privacy and comfort may be provided for the passenger. Furthermore, installation on existing seat rails provides great flexibility in partitioning the cabin, wherein an oblique arrangement of the compartment saves space. Based on these advantages, a positive reception may be expected both from passengers and from airlines, which results in improved economy.

The compartment in another example of the invention, is delimited by two angled partition segments that are substantially identical in shape, as well as by an outer wall section of the cabin of the commercial aircraft, in whose cabin space the compartment or the angled partition segments are installed. In this arrangement, the two partition segments are arranged in substantially longitudinal direction of the cabin space, at a distance from each other, so that between them an opening for an access door to the compartment is formed. This opening basically is a reveal for the door, in which reveal for example, a convoluted rubber gaiter, a sliding door or a normal hinged door may be installed. Since the angled partition segments do not reach all the way to the ceiling of the cabin space but instead are of such a height that a space remains between the upper edge of the partition segments and the cabin ceiling, the opening for the access door to the compartment is not an opening with a frame all around it, but instead is an opening gap to the compartment.

For optimal utilization of the space provided by the compartment according to one example of the invention, the two partition segments comprise several straight partition sections that are arranged at such an angle in relation to each other, that niche sections are formed in the partition segments, which niche sections are, for example, suitable for accommodating a combined item of furniture for sitting on or lying on, hereinafter designated a combination seat and couch or seat/couch for short. By forming niche sections, good use of the available space in the compartment, is taken advantage of, and a space-saving compartment arrangement made of several individual compartments that are mutually nested in such a way that the respective niche sections of one compartment project into the respective adjacent compartments, is allowed.

In one example of the partition segments, each of these segments comprises a first partition section that extends spaced apart from and substantially parallel to the outer wall section of the cabin, and forms a first side partition of a first niche section. The first partition section separates the compartment from a passenger aisle in the cabin space of the commercial aircraft. In this arrangement, the door openings are formed between the first partition sections of the two partition segments. Furthermore, the two partition segments comprise a second partition section that forms a rear partition of the first niche section of the compartment. A third partition section which is angled forms a second side partition, that is arranged opposite the first side partition of the first niche section, and closes the compartment off to the outer wall section of the cabin.

In order that the individual partition segments may easily be installed and stored in a space-saving way, the first partition section is rotatably connected to the second partition section, and the second partition section is rotatably connected to the third partition section such that the partition segments may be folded together completely. For example, the individual partition sections may be foldably or hingeably interconnected by way of hinges or elastic elements, such as film hinges.

In order for several compartments to be arranged in the most space saving manner, an oblique arrangement of the individual compartments, in one example, is favorable. In this way, minimal usage of space in the cabin of the commercial aircraft may be achieved, while at the same time, maximising the space that is available in the individual compartments. Accordingly, the alignment of the niche sections does not extend in longitudinal direction of the aircraft cabin; instead, the alignment of the niche sections is inclined in relation to the longitudinal direction of the cabin space, which causes the first side partition and the second side partition viewed in horizontal projection to move apart, starting from the rear partition of the niche section. In other words, there is a trapezoidal opening-up of the niche section.

A particularly space-saving arrangement of several compartments may be achieved in that the bisecting line of the angle of the first side partition and of the second side partition forms an angle of 15-23° to the outer wall section of the cabin.

In order to provide sufficient space for a compartment passenger to be able to lie down without being restricted, the angled third partition section together with the outer wall section of the cabin forms a second niche section, which is opposite the first niche section in the compartment so as to be slightly offset. With a corresponding design of the seat/couch, this item of furniture may be folded out such that it extends, as a horizontal surface for lying on, right into the second niche section. In this arrangement, the dimensions of the compartment are selected such that with minimum cabin space required an substantially horizontal position for lying on, and thus, maximum comfort for the target group of first-class passengers, may be achieved. As an alternative, in the second niche section, a simple item of furniture for sitting on, for example an ottoman, may be arranged, which may serve as a footrest in the horizontal sleeping position of the passenger.

As indicated above, by a nested arrangement of several compartments, the limited space available in a cabin may be utilised to good effect. In order to nest several compartments in relation to each other, a first partition segment forms a front partition of a compartment, thus separating the compartment from an adjacent compartment. A second partition segment forms a rear partition of the compartment, thus separating the compartment from yet another adjacent compartment. Thus, a multitude of identical compartments in substantially longitudinal direction of the cabin are arranged so as to be separated from each other by identical partition segments, as a result of which the space that is available in the cabin may be utilised to good effect.

As well known in the field, seats in commercial aircraft are affixed to so-called seat rails that are arranged on the floor of the cabin space. In this arrangement, such seat rails provide a grid in which the seats may be incrementally slid and fixed in longitudinal direction. According to one example of the invention, such seat rails are also used for affixing the seats/couches, wherein at the same time, also the first and second partition segments are fixed. The seat rails are thus not only used for affixing the seats/couches, but also for affixing the partition segments, as a result of which both the seats/couches and the partition segments may be incrementally slid in substantially longitudinal direction and may be affixed such that the longitudinal extension of the compartments is variably changeable.

In order to provide the best possible privacy to a passenger in the compartment, at least the first partition section is sufficiently high for a person of average stature to be unable to see above the first wall partition and into the compartment. Since commercial aircraft comprising compartments according to one example of the invention are preferably used for long-distance flights and will therefore be in operation anywhere on the globe, the average stature must not refer to an average stature as it applies merely to individual continents, which stature may vary quite substantially. Instead, an average stature may correspond to an averaged across the globe. Thus, in one example, the first partition section is at least 180 cm or more in height. Preferably, the first partition section should however be higher than 190 cm, because in particular, in northern Europe, the average stature is taller than in other regions of the globe. However, in order to optimally ensure the privacy of compartment passengers, at least the first partition section should be 200 cm or more in height, so as to reliably block the view into the compartment.

Finally, it should be mentioned that the partition segments may be made of a laminated material, as a result of which, weight optimisation may be ensured while providing very good stability characteristics of the partition segments. The savings in weight are not just required to keep the overall weight of the commercial aircraft as light as possible. In addition, the savings in the weight of the partition segments are also desirable so that the partition segments may be transported and installed in the easiest way possible.

BRIEF DESCRIPTION OF THE DRAWINGS

Below, the present invention is described in more detail with reference to the attached drawings, as follows:

FIG. 5 shows a foldable version of a partition segment in one example of the invention.

In all figures identical, similar, or corresponding reference characters are used for identical or substantially corresponding elements.

DETAILED DESCRIPTION

Figure 1:
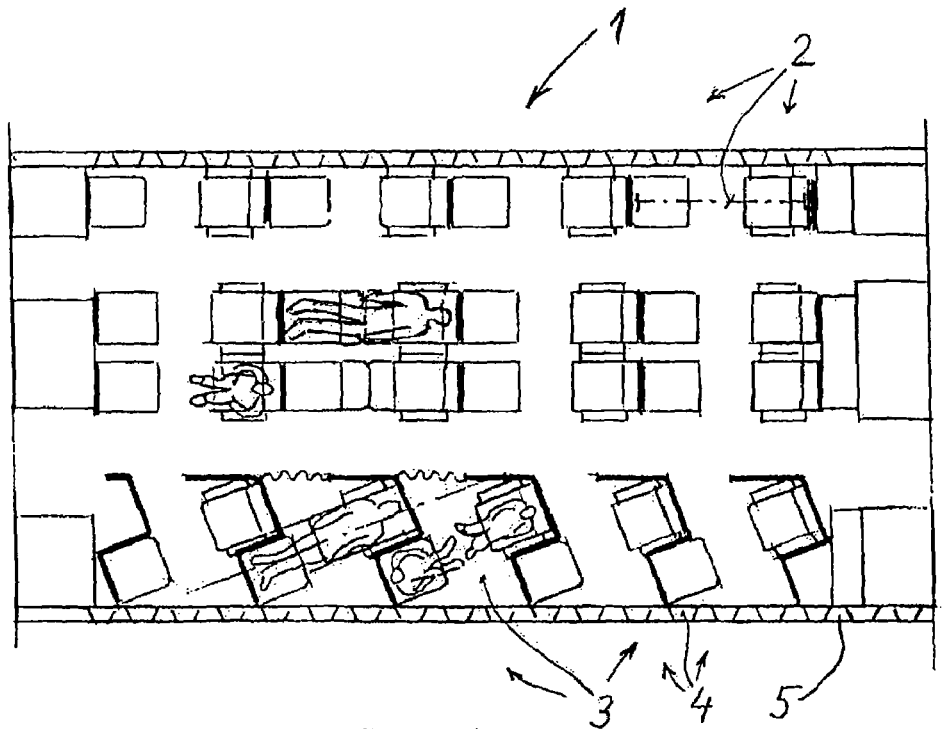
FIG. 1 shows a horizontal projection of a cabin section in a commercial aircraft with five compartments according to one example of the invention.

FIG. 1 shows a cabin section 1 of a commercial aircraft with a mixed use of business class or economy class seats 2 and compartments 3 according to one example of the invention. In a way that differs from the usual custom of installing business class and first class in cabin sections 1 that are arranged one behind the other, this example provides the option of lateral separation of business class and first class.

Figure 2:
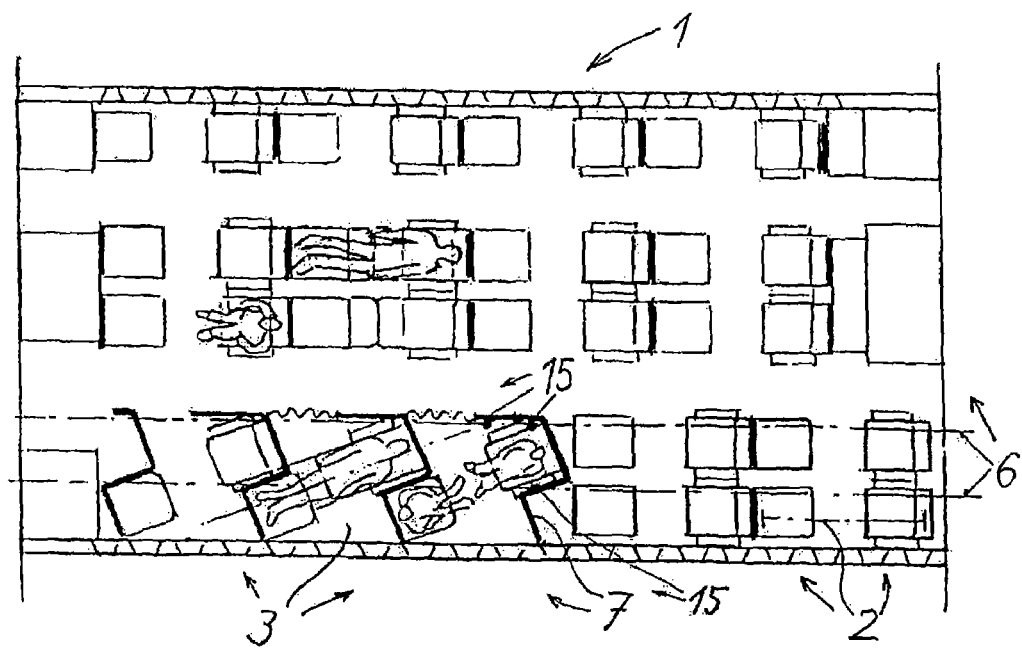
FIG. 2 corresponds to FIG. 1 and shows the horizontal projection of a cabin section in a commercial aircraft with three compartments in one example of the invention.

Due to its enclosed nature which offers privacy, and the many built-in equipment elements, the individual compartment 3 provides a higher level of comfort than the openly placed business class or economy class seats 2. Furthermore, each compartment has access to at least three windows 4 in the outer wall 5, which is advantageous for illumination and for the wellbeing of the passengers in the compartments. The arrangement of business class 2 and the compartments 3 further provides an advantage in that there is improved flexibility when compared to the arrangement of business class or economy class and first class along the cabin. While in FIG. 1, twelve business class seats 2 and five compartments 3 are provided, for instance in the same cabin section 1. As an alternative, for example, sixteen business class seats 2 and three compartments 3 may be accommodated, as shown in FIG. 2. In this way the seating configuration may be matched to the actual requirements, without empty spaces arising. This is easily achieved because the partition segments 7 of the compartments are fixed in the seat rails 6 only at a few points 15, which ensures ease of installation.

Figure 3:
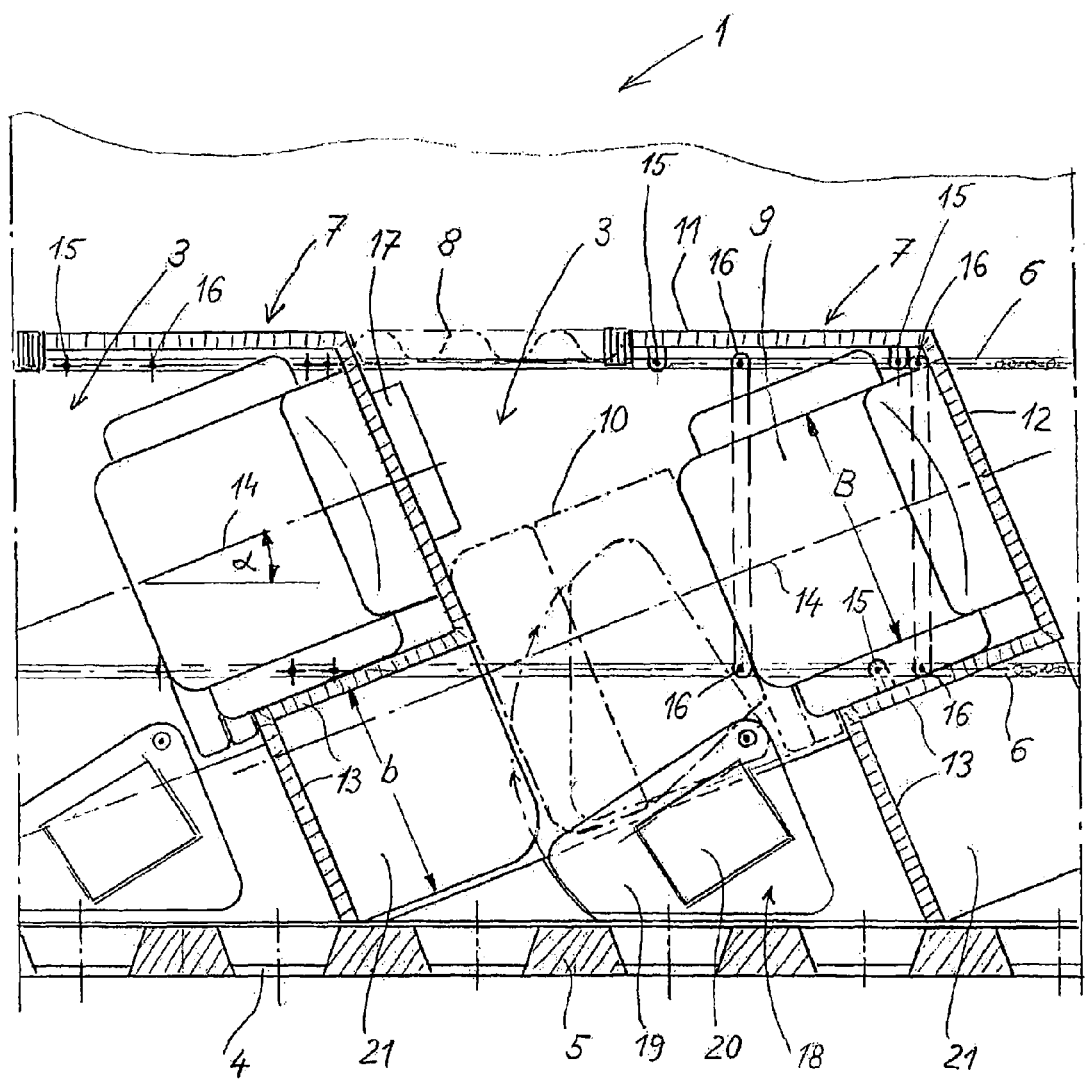
FIG. 3 shows a top view of the individual elements of a compartment in one example of the invention.

FIG. 3 shows a top view of a compartment 3 with its individual elements. The space of the compartment 3 is formed by two identical partition segments 7', 7" with a door 8 in between, and by the outer wall 5 of the cabin. In order to provide the privacy desired by passengers, the partition segments 7', 7" are at least 180 cm in height, wherein the partition segments 7', 7" are, however, preferably at least 190 cm or even 200 cm in height. Such a height of the compartment 3 may easily be accommodated in the large-volume cabin of a long-range aircraft.

The compartment 3 is provided with an item of furniture 9 for sitting on or lying on, which may be converted from a sitting position to a couch 10. The seat/couch 9 is enclosed by the partition segment 7" such that the first partition section 11 extends as a substantially longitudinal partition substantially parallel to the outer wall 5 of the cabin, the second partition section 12 is arranged as a cross partition substantially perpendicular to the center axis 14 of the seat/couch, and the third partition section 13, which follows on at a substantially right angle, delimits the compartment 3 towards the outer wall 5 of the cabin. Only at the beginning of a row of compartments 3, it may be expedient to design a shorter first partition section 11 so as to save space, as shown in FIGS. 1 and 2.

For space-saving accommodation of the compartment 3 in the cabin 1, the center axis 14, as depicted in FIG. 3, is arranged at an angle α of 22-25°, in relation to the outer wall 5, or alternatively, the center vertical between the first partition section 11 and the side partition of the third partition section 13, which side partition adjoins the second partition section 12, is arranged at an angle, for example, 15-23° in relation to the outer wall. This substantially oblique arrangement results in an overlap or nested arrangement of the front and rear of the compartment 3, as a result of which it is possible to save space in the cabin 1, while at the same time, within the compartment, providing additional space in the region of the door 8 and the window 4.

As a result of the open-top design of the compartment 3, the ventilation and air conditioning system 1 that exists in the cabin 1 may be used without having to take special measures. This facilitates fast rearrangement of the cabin 1, for example in order to rearrange business class regions to compartment regions.

Seat rails 6 that are normally arranged in the cabin floor are used both for attaching the seats 9 and for the individual compartment partition segments 7, 7'. Due to the angled, inherently stable form of the partition segments 7, 7', 7", three attachment points 15 in the seat rails 6 are sufficient for safe positioning of said partition segments 7, 7', 7". There is thus no need to connect the angled third partition section 13 to the interior panel of the outer wall 5 of the cabin.

The seat/couch 9 has attachment points 16 of its own so as to be able to transfer greater forces. As shown in the horizontal projection, the seat/couch 9, in its position 10 for lying on, comprises a width B, while the foot end in the region of the third partition section 13 comprises a narrower width b. In this design the width b is arranged so as to be asymmetrical in relation to the centre axis 14 of the seat/couch. Using this preferred layout, a correspondingly sized seat/couch 9 may be accommodated in a space-saving manner in the niche formed by the partition sections 11, 12, 13, without any negative effect on sleeping comfort. Of course also a compartment geometry is utilizing identical dimensions of B and b may be used.

Due to their dimensions, the partition sections 11, 12, 13 provide adequate accommodation options for equipment elements such as for example a wardrobe 17, a telephone, decorative elements, mirrors and the like. Since the minimum height of the partition segments 7, in one example is 180 cm, preferably 190 or more preferably 200 cm, and the compartment 3 comprises a door 8, privacy is provided. Depending on requirements, the door 8 may be a convoluted rubber gaiter, a sliding door or a hinged door. In certain states, a number of the cabin crew is required to monitor passengers' compliance with rules for fastening their seat belts and a member of the crew only needs to open the door 8 in order to briefly obtain access to the private sphere of a compartment passenger. In this way passenger privacy is only briefly disturbed by a crew member, without any other passengers being able to view the compartment.

Taking into account the usual distance, in long-range aircraft, between ribs on the frame, a compartment 3 has a long pro-rata length of three rib fields on the outer wall 5 of the cabin, each rib field comprising a window. This provides an exceptionally good view to the outside and also provides daylight illumination. Of course, the compartments may also extend along more than three windows.

To provide a further element of comfort the space between the seat/couch 9, in its position for lying on, and the outer wall 5 may be used to accommodate a baggage area 18 with a hingeable tabletop 19. A hingeable video display screen 20 may be integrated in the tabletop so that a functional workplace is available to the passenger. According to one example, the foot part opposite the seat/couch 9 comprises an additional seat 21 in the region of the third partition section 13, as a result of which the kinematics of the seat/couch is simplified. In this case, there is no need to provide, on the seat/couch 9, a seat element, which may be hinged to the horizontal position, of the size of the additional seat 21.

Figure 4:
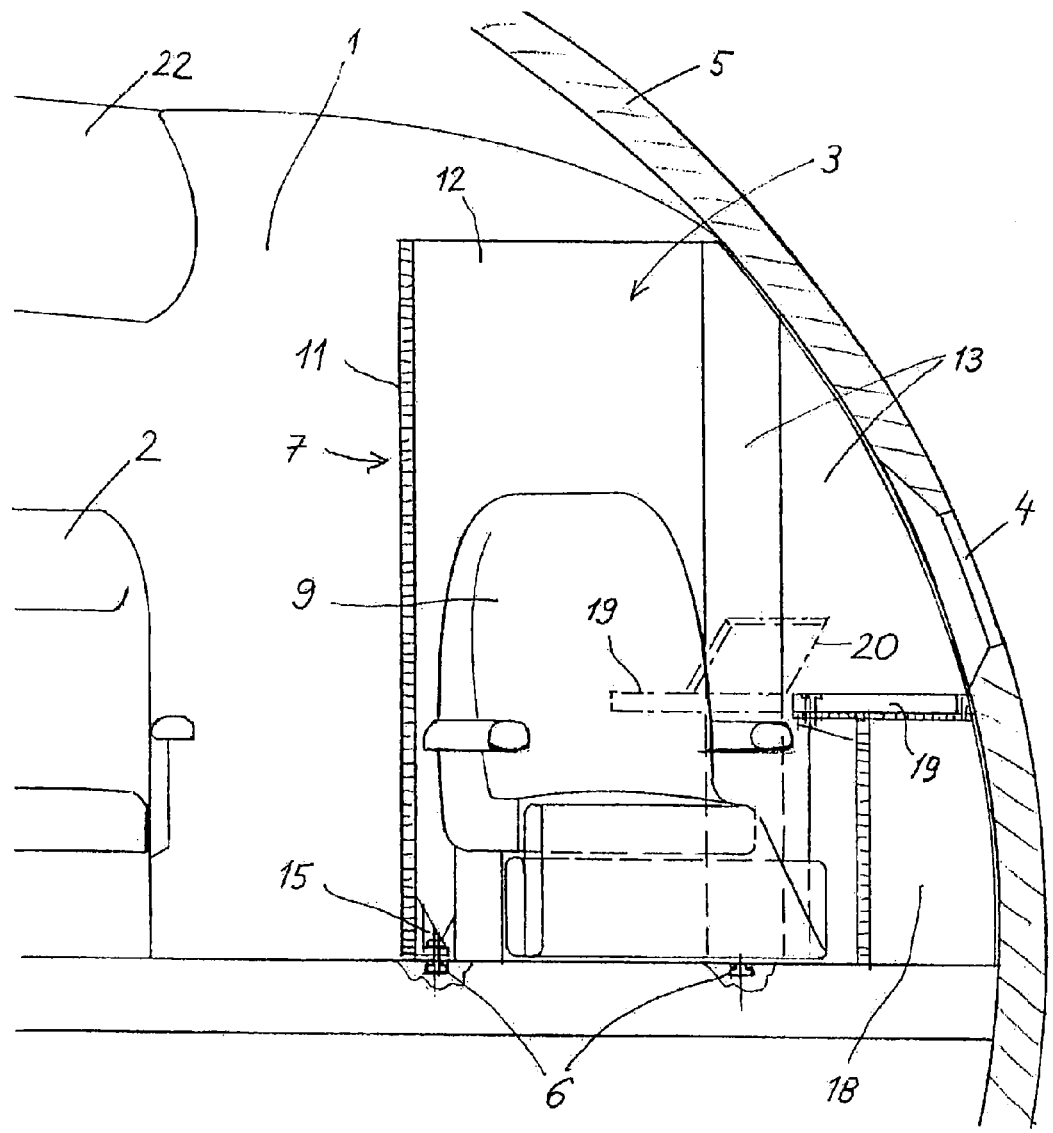
FIG. 4 shows a cross section of a cabin with a compartment in one example of the invention.

FIG. 4 shows a cross section of the cabin 1 with a compartment 3. The seat rails 6 installed in the floor are used for attaching the seat/couch 9 and the compartment partition segment 7. Due to its inherently stable shape, the partition segment 7 requires no further support to the outside wall 5. The tabletop 19 with video display screen 20 is shown in its swivelled out position in FIG. 4. The space available between the area of the seat and the outer wall 5 may be used as a baggage storage space 18 instead of the normal overhead baggage storage areas 22. The partition sections 11, 12 and 13 of the partition segment 7 are preferably made from a laminated material, such as a plastic sandwich panel, which results in a lightweight rigid construction. The large partition surfaces of the compartment 3 are used for accommodating equipment elements and may be constructed to create a particular design.

FIG. 5 shows an example of the partition segment 7, in which the individual wall sections may be hinged together. The individual partition sections 11, 12 and 13 are connected, one behind the other, by way of rotary axes 23, for example with the use of hinges, such that space-saving storage of the partition segment 7 becomes possible. For installation in a cabin 1, attachment points 15 engage seat rails 7. If required, the partition elements 11, 12, 13 may be interlocked by way of fittings (not shown).

FIG. 5a shows the partition segment 7 installed in the cabin 1, whereas FIG. 5b shows the partition segment 7 folded in or folded together for storage 1.

LIST OF REFERENCE CHARACTERS

1 Cabin section
2 Business class seat
3 Compartment
4 Window
5 Outer wall of the cabin
6 Seat rail
7 Partition segment
8 Door
9 Seat/couch
10 Seat/couch in the position for lying on
11 First partition section
12 Second partition section
13 Third partition section
14 Centre axis of seat
15 Attachment point for the partition segment
16 Attachment point for the seat/couch
17 Wardrobe
18 Storage space
19 Tabletop
20 Display screen
21 Additional seat
22 Baggage storage area
23 Rotary axis

The invention claimed is:

1. A compartment for installation in a cabin space of a commercial aircraft, comprising:
a first angled partition segment with an angled form;
a second angled partition segment with an angled form; and
an outer wall section of the cabin space of the commercial aircraft, wherein the first partition segment and the second partition segment have the same shape and are arranged in a longitudinal direction of the cabin space, at a distance from each other, defining a space for an opening for an access door to the compartment,
wherein both the first partition segment and the second partition segment comprises several straight partition sections that are arranged at such an angle in relation to each other such that a first niche section is formed in the respective first and second partition segments, the first niche section of the compartment being formed by the sections of the second partition segment,
wherein the first partition segment and the second partition segment comprise:
a first partition section that extends spaced apart from and substantially parallel to the outer wall section of the cabin space; wherein the first partition section of the second partition segment forming a first side partition of the first niche section of the compartment;
a second partition section; wherein the second partition section of the second partition segment forming a rear partition of the first niche section of the compartment, and the second partition section of the first partition segment forming a rear partition of the first niche section of a first adjacent compartment forward of the compartment; and
a third partition section having an angled portion; wherein the third partition section of the second partition segment forming a second side partition of the first niche section, the second side partition arranged opposite the first side partition of the first niche section of the compartment and the third partition section closing the compartment off to the outer wall section of the cabin space; and
wherein the first partition section is pivotably connected to the second partition section and the second partition section is pivotably connected to the third partition section.

2. The compartment of claim 1, wherein the first niche section of the compartment accommodates a seat and couch combination.

3. The compartment of claim 2, wherein the geometry of the compartment is such that the seat and couch combination is capable of forming a substantially horizontal bed.

4. The compartment of claim 1, wherein the first side partition and the second side partition, when viewed in horizontal projection, are observed to be angled divergent from each other, starting from the rear partition of the first niche section.

5. The compartment of claim 1, wherein the third partition section of the first partition segment together with the outer wall section of the cabin space forms in the compartment a second niche section, opposite of the first niche section formed by the second partition segment.

6. The compartment of claim 5, wherein the first partition segment forms a front partition of the compartment, separating the compartment from a first adjacent compartment, and the second partition segment forms a rear partition of the compartment, separating the compartment from a second adjacent compartment.

7. The compartment of claim 2, wherein a floor of the cabin space of the commercial aircraft comprises seat rails and the seat and couch combination and the first and second partition segments are fixed by the seat rails to the floor of the cabin space.

8. The compartment of claim 1, wherein at least the first partition section is of at least 180 cm in height.

9. The compartment of claim 6, wherein the first partition section is at least 180 cm in height.

10. The compartment of claim 1, wherein a median or a bisecting line of the first side partition and of the second side partition is arranged at an angle in a range of 15°-23° in relation to the outer wall section of the cabin.

11. The compartment of claim 1, wherein the first partition segment and the second partition segment are made from a laminated material.

12. A compartment arrangement, comprising at least two compartments according to claim 1, wherein the at least two compartments define at least a first compartment and a second compartment, wherein the first compartment and the second compartment are nested, such that the first niche section formed in the first compartment is arranged adjacent to a second niche section formed in the second compartment, the second niche section of the second compartment being in addition to the first niche section formed in the second compartment.

13. A passenger compartment for a cabin of a passenger aircraft comprising:

an aisle extending along a length of the passenger aircraft, the aisle having a longitudinal direction along the axis of the length of the passenger aircraft;

a plurality of passenger seats, each of the plurality of passenger seats having an interior facing side, a back side and an exterior facing side, the interior facing side and the exterior facing side being disposed at a first angle to the longitudinal direction of the aisle greater than zero, and the back side being disposed at a second angle greater than ninety degrees;

a plurality of angled partitions, each one of the plurality of angled partitions being deployable in the cabin of the passenger aircraft and being comprised of:

a first partition section arrangeable on the interior facing side of one of the plurality of passenger seats, when the plurality of angled partitions are deployed in the cabin of the passenger aircraft, such that the interior facing side of a first one of the plurality of passenger seats is partitioned from the aisle by the first partition section of a first one of the plurality of angled partitions, and the interior facing side of a second one of the plurality of passenger seats is partitioned from the aisle by a second one of the plurality of passenger seats; and a second partition section having a first end and a second end, the first end of the second partition being attached to the first partition section and the second end, opposite from the first end, being attached to a third partition section, the second partition section having a connecting portion extending between the first end of the second partition and the second end of the second partition, the connecting portion of the second partition being disposed at a third angle to the first partition section and at a fourth angle to the third partition section, such that a first niche is formed around the interior facing side, the back and the exterior facing side of each one of the plurality of passenger seats, wherein the first one of the plurality of angled partitions is disposed at a distance along the longitudinal direction of the aisle from the second one of the plurality of angled partitions, and the first one of the plurality of angled partitions and the second one of the plurality of angled partitions define a passenger compartment around the first one of the plurality of passenger seats, wherein the first partition section is pivotably connected to the second partition section and the second partition section is pivotably connected to the third partition section.

14. The passenger compartment of claim 13, wherein the first partition section includes a door.

15. The passenger compartment of claim 14, wherein the door of the first partition section includes accordion folds, such that the door is storable.

16. The passenger compartment of claim 13, wherein the first partition section pivotably folds for storage behind the back side of one of the plurality of passenger seats.

17. The compartment of claim 13, wherein the third partition section is attached to a fourth partition section and forms a fifth angle with the fourth partition section, such that the second of the plurality of angled partitions defines a second niche in the passenger compartment opposite of the first niche defined around the first one of the plurality of passenger seats.

18. The compartment of claim 14, wherein the second niche includes an additional passenger seat in addition to the plurality of passenger seats, and the additional passenger seat facing in a direction opposite of the first one of the plurality of passenger seats, such that the first one of the plurality of passenger seats is capable of pivotably extending to fill a gap between the first one of the plurality of passenger seats and the additional passenger scat, such that a sleeping berth is defined by the first one of the plurality of passenger seats and the additional passenger seat.

* * * * *